(No Model.)

J. WALKER.
UNIVERSAL JOINT COUPLING FOR PIPES.

No. 437,736. Patented Oct. 7, 1890.

Witnesses
E. D. Smith
Thomas Durant

Inventor
Joseph Walker,
By his Attorneys
Church & Church

UNITED STATES PATENT OFFICE.

JOSEPH WALKER, OF CLARK'S GREEN, PENNSYLVANIA.

UNIVERSAL-JOINT COUPLING FOR PIPES.

SPECIFICATION forming part of Letters Patent No. 437,736, dated October 7, 1890.

Application filed February 14, 1890. Serial No. 340,415. (No model.)

*To all whom it may concern:*

Be it known that I, JOSEPH WALKER, of Clark's Green, in the county of Lackawanna and State of Pennsylvania, have invented certain new and useful Improvements in Universal-Joint Couplings for Pipes; and I do hereby declare the following to be a full, clear, and exact description of the same, reference being had to the accompanying drawings, forming a part of this specification, and to the letters of reference marked thereon.

My invention has for its object to provide an improved universal-joint coupling for pipes employed to conduct steam, gas, water, air, &c.; and it consists of a coupling composed of a novel combination of parts arranged and adapted substantially as I will now proceed to describe, and point out particularly in the clauses of claim at the end of this specification.

Figure 1:
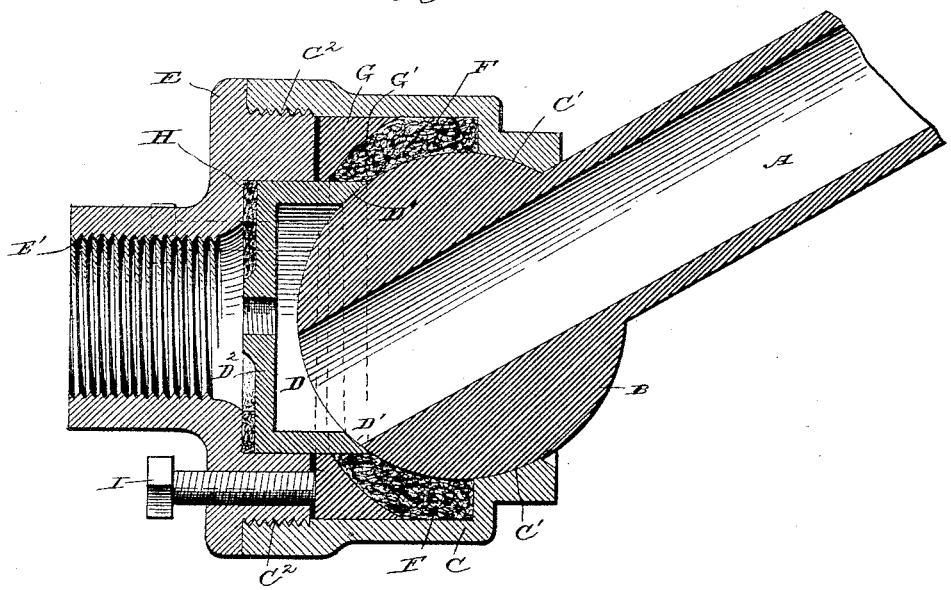
Figure 2:
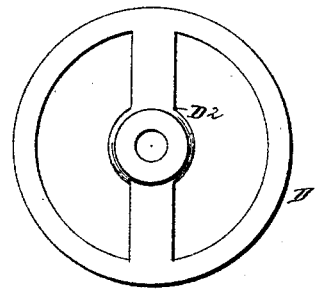

In the accompanying drawings, Figure 1 represents a longitudinal sectional view of a coupling constructed in accordance with my invention. Fig. 2 is a detail view of one of the rings which enter into the structure of the coupling.

Similar letters of reference in the several figures indicate the same parts.

The letter A indicates a pipe having formed upon one of its ends a spherical enlargement B.

C is a cap having a bearing-surface C', shaped to fit the spherical enlargement B of the pipe and be united to another cap E by a screw-threaded connection $C^2$.

D is a ring having bearing-surfaces D' D', also adapted to fit the enlargement B. This ring fits within a recess in the cap E, and is held in proper position by said cap, a packing-ring H being interposed between it and the cap, as shown.

In the space bounded by the enlargement B, caps C and E, and ring D is inserted packing material F, and also a ring G, which has a concave-formed face G', and is adapted to be adjusted by means of set-screws I, so as to crowd the packing closer and tighter when occasion requires.

In assembling the parts of the coupling it is found convenient to first slip the cap C onto the pipe A till it becomes seated against the enlargement B. Then place the ring D in position on the enlargement B, temporarily holding said ring there by means of a screw-rod passed through the pipe and screwed into the cross-bar $D^2$ of said ring. (Seen in Fig. 2.) Then place in position the packing material F. Then insert the compression-ring G, the packing-ring H, and finally screw into place the cap E, as will be readily understood.

As the packing F becomes loose or worn, it can be tightened by means of the screw I and a tight joint preserved.

The smaller portions of the cap E are screw-threaded, as shown at E', for connection with a pipe to which the coupling is to be attached.

A coupling constructed in accordance with my invention permits of a universal movement of the connected pipes and at the same time preserves tight joints all around. It may be employed for connecting steam, gas, water, air, or other pipes, and will be found particularly useful in joining pipes that are used for conveying steam from locomotive-boilers through railway-cars for heating purposes, for joining pipes used for conveying gas through such cars, for connecting border-lights in theaters, and generally wherever a universal-joint connection between pipes is needed.

I claim as my invention—

1. In a pipe-coupling, the combination, with the pipe having a semi-spherical enlargement B at its end, of the cap C, ring D, fitted to the contour of said enlargement, and the cap E, for holding said cap C and ring D in position, substantially as described.

2. In a pipe-coupling, the combination, with the pipe having the semi-spherical enlargement or head, of the cap C, seated against the enlargement B, the ring D, shaped to conform to said enlargement, the packing F, and the screw-cap E, inclosing ring D and united to cap C, substantially as described.

3. In a pipe-coupling, the combination, with the pipe having the semi-spherical enlargement or head, of the cap C, seated against the enlargement B, ring D, shaped to conform to said enlargement, cap E, inclosing ring D and united to cap C, packing F, ring G, and means for adjusting it, substantially as described.

JOSEPH WALKER.

Witnesses:
T. C. VON STORCH,
MILTON W. LOWRY.